(12) United States Patent
Gardner et al.

(10) Patent No.: US 9,270,205 B2
(45) Date of Patent: Feb. 23, 2016

(54) REGENERATIVE DRIVE FOR PIEZOELECTRIC TRANSDUCERS

(71) Applicant: FUJIFILM Dimatix Inc., Santa Clara, CA (US)

(72) Inventors: Deane A. Gardner, Cupertino, CA (US); Paul A. Hoisington, Hanover, NH (US)

(73) Assignee: FUJIFILM DIMATIX INC., Santa Clara, CA (US)

( * ) Notice: Subject to any disclaimer, the term of this patent is extended or adjusted under 35 U.S.C. 154(b) by 112 days.

(21) Appl. No.: 14/022,669

(22) Filed: Sep. 10, 2013

(65) Prior Publication Data

US 2015/0069934 A1    Mar. 12, 2015

(51) Int. Cl.
*B41J 29/38* (2006.01)
*H02N 2/00* (2006.01)
*B41J 2/045* (2006.01)

(52) U.S. Cl.
CPC ............ *H02N 2/0075* (2013.01); *B41J 2/04536* (2013.01); *B41J 2/04548* (2013.01); *B41J 2/04568* (2013.01); *B41J 2/04581* (2013.01)

(58) Field of Classification Search
CPC ....... H01L 41/00; H01L 41/04; H01L 41/042; H01L 41/08
USPC .......................................... 318/116; 347/9–12
See application file for complete search history.

(56) References Cited

U.S. PATENT DOCUMENTS

| | | | |
|---|---|---|---|
| 4,749,897 A | 6/1988 | Natsume et al. | |
| 6,563,252 B2 * | 5/2003 | Schrod | 310/316.03 |
| 7,556,327 B2 | 7/2009 | Gardner | |
| 7,812,503 B2 * | 10/2010 | Kakehi et al. | 310/317 |
| 8,860,388 B2 * | 10/2014 | Penberth | 323/271 |
| 2010/0220133 A1 * | 9/2010 | Oshima | B41J 2/04541 347/10 |
| 2012/0229541 A1 | 9/2012 | Satoh et al. | |
| 2013/0194833 A1 | 8/2013 | Penberth | |
| 2014/0240383 A1 * | 8/2014 | Penberth | 347/10 |

FOREIGN PATENT DOCUMENTS

| | | |
|---|---|---|
| GB | 2494116 | 3/2013 |
| JP | 2003-148221 | 5/2003 |
| WO | 2011/151642 | 12/2011 |
| WO | 2013/030560 | 3/2013 |
| WO | WO 2013030560 A1 * | 3/2013 |
| WO | 2013/076510 | 5/2013 |

* cited by examiner

*Primary Examiner* — Eduardo Colon Santana
*Assistant Examiner* — Bickey Dhakal
(74) *Attorney, Agent, or Firm* — Occhiuti & Rohlicek LLP

(57) ABSTRACT

A method for regenerative driving of one or more transducers includes, for each of a plurality of driving cycles, enabling a number of transducers for driving, configuring a configurable capacitive energy storage element based on the number of enabled transducers and a desired overall capacitance, transferring a predetermined quantity of energy from a power supply to a first inductive energy transfer element, distributing the predetermined quantity of energy from the first inductive energy transfer element to the configurable capacitive energy storage element and to one or more other capacitive energy storage elements, each of the other capacitive energy storage elements coupled to an associated transducer, transferring energy from the one or more capacitive energy storage elements and from the configurable capacitive energy storage element to a second inductive energy transfer element, and transferring energy from the second inductive energy transfer element to the power supply.

22 Claims, 4 Drawing Sheets

REGENERATIVE DRIVE FOR PIEZOELECTRIC TRANSDUCERS

BACKGROUND

This invention relates to a regenerative drive for piezoelectric transducers.

Piezoelectric transducers are often employed in the designs of fluidic drop ejectors and in particular, inkjet printers which use piezoelectric drop on demand (DOD) technology. This type of inkjet printer uses a number of print jets, each having an ink-filled chamber in which a piezoelectric element is disposed. Applying a voltage to the piezoelectric element causes the element to deform. The deformation of the piezoelectric element causes a pulse of pressure within the ink filled chamber, forcing expulsion of a drop of ink from the print jet. Applying different types of voltage waveforms to the piezoelectric element can vary the amount and the pattern of the ink expelled from the print jet.

In conventional inkjet printers, the piezoelectric element is typically driven using a resistive class drive such as a linear amplifier or a rail-to-rail pulser which exhibits power loss in that approximately 10% of the power consumed by the driver is delivered to the piezoelectric element.

SUMMARY

In a general aspect, a method for regenerative driving of one or more transducers includes, for each of a plurality of driving cycles, enabling one or more of the plurality of transducers for driving, resulting in a number of enabled transducers, configuring a configurable capacitive energy storage element based on the number of enabled transducers and a desired overall capacitance, transferring a predetermined quantity of energy from a power supply to a first inductive energy transfer element, distributing the predetermined quantity of energy from the first inductive energy transfer element, to the configurable capacitive energy storage element and to one or more capacitive energy storage elements of a plurality of capacitive energy storage elements, each energy storage element of the plurality of energy storage elements being coupled to an associated transducer, transferring energy from the one or more capacitive energy storage elements and from the configurable capacitive energy storage element to a second inductive energy transfer element, and transferring energy from the second inductive energy transfer element to the power supply.

Aspects may include one or more of the following features.

Transferring the predetermined quantity of energy from the power supply to the first inductive energy transfer element may include transferring the predetermined quantity of energy to a primary winding of a first transformer, distributing the predetermined quantity of energy from the first inductive energy transfer element to the configurable capacitive energy storage element and to the one or more capacitive energy storage elements may include distributing the predetermined quantity of energy from the primary winding of the first transformer, via a secondary winding of the first transformer, transferring the energy from the one or more capacitive energy storage elements and from the configurable capacitive energy storage element to the second inductive energy transfer element may include transferring the energy from the one or more capacitive energy storage elements and from the configurable capacitive energy storage element via a primary winding of a second transformer, and transferring the energy from the second inductive energy storage element to the power supply may include transferring the energy from the primary winding of the second transformer, via a secondary winding of the second transformer, to the power supply.

The first inductive energy transfer element and the second inductive energy transfer element may be the same element. The configurable capacitor network may include a plurality of selectable capacitors and configuring the configurable capacitive energy storage element may include selecting certain capacitors of the plurality of selectable capacitors based on a set of configuration bits. The method may also include determining the predetermined quantity of energy based on a desired voltage for application to the number of enabled transducers.

Determining the predetermined quantity of energy and configuring the configurable capacitive energy storage element may be based on a desired rate of change of the desired voltage for application to the number of enabled transducers. Determining the predetermined quantity of energy may include accounting for a history of prior voltages applied to the number of enabled transducers. The first transformer and the second transformer may be flyback transformers operating in discontinuous conduction mode.

Transferring the predetermined quantity of energy from the power supply to the first inductive energy transfer element may include transferring the predetermined quantity of energy to a first two-terminal inductor and transferring the energy from the second inductive energy storage element to the power supply may include transferring the energy from a second two-terminal inductor to the power supply. The first two-terminal inductor and the second two-terminal inductor may be the same two-terminal inductor. Each of the plurality of transducers may include a piezoelectric element.

In another general aspect, a system for regenerative driving of one or more transducers includes a plurality of transducers, a configurable capacitive energy storage element, a first inductive energy transfer element, a second inductive energy transfer element, and a controller for operating the system through a plurality of driving cycles. The controller is configured to, for each of the plurality of driving cycles, enable one or more of the plurality of transducers for driving, resulting in a number of enabled transducers, configure the configurable capacitive energy storage element based on the number of enabled transducers and a desired overall capacitance, transfer a predetermined quantity of energy from a power supply to the first inductive energy transfer element, distribute the predetermined quantity of energy from the first inductive energy transfer element, to the configurable capacitive energy storage element and to one or more capacitive energy storage elements of a plurality of capacitive energy storage elements, each energy storage element of the plurality of energy storage elements being coupled to an associated transducer, transfer energy from the one or more capacitive energy storage elements and from the configurable capacitive energy storage element to the second inductive energy transfer element, and transfer energy from the second inductive energy transfer element to the power supply.

Aspects may include one or more of the following features.

The first inductive energy transfer element may include a first transformer, the second inductive energy transfer element may include a second transformer, and the controller may be further configured to transfer the predetermined quantity of energy from the power supply a primary winding of the first transformer, distribute the predetermined quantity of energy from the primary winding of the first transformer, via a secondary winding of the first transformer, to the configurable capacitive energy storage element and the one or more capacitive energy storage elements, transfer the energy from the one or more capacitive energy storage elements and from the configurable capacitive energy storage element to a primary winding of the second transformer, and transfer the energy from the primary winding of the second transformer, via a secondary winding of the second transformer, to the power supply.

The first inductive energy transfer element and the second inductive energy transfer element may be the same element. The configurable capacitor network may include a plurality of selectable capacitors and the controller may be configured to configure the configurable capacitive energy storage element including selecting certain capacitors of the plurality of selectable capacitors based on a set of configuration bits. The controller may be configured to determine the predetermined quantity of energy based on a desired voltage for application to the number of enabled transducers. The controller may be configured to determine the predetermined quantity of energy and configure the configurable capacitive energy storage element based on a desired rate of change of the desired voltage for application to the number of enabled transducers.

The controller may be configured to determine the predetermined quantity of energy including accounting for a history of prior voltages applied to the number of enabled transducers. The first transformer and the second transformer may be flyback transformers configured to operate in discontinuous conduction mode. The first inductive energy transfer element may include a first two-terminal inductor, the second inductive energy transfer element may include a second two-terminal inductor, and the controller may be configured to transfer the predetermined quantity of energy from the power supply to the first two-terminal inductor and transfer the energy from the second two-terminal inductor to the power supply. The first two-terminal inductor and the second two-terminal inductor may be the same two-terminal inductor. Each of the plurality of transducers may include a piezoelectric element.

In another aspect, in general, an approach to control of an array of piezoelectric inkjet printheads makes use of an energy transfer approach in which, in each of a series of energizing cycles, energy is first transferred from a power source to an inductor, and then transferred between the inductor and a combination of a selected subset of the printhead's piezoelectric actuator elements and a configurable capacitor, which is configurable according to the selected subset of the actuators, optionally configured further according to states of those actuators prior to the transfer of energy. In some examples, the energy in the actuators and configured capacitors is recovered at the end of the energizing cycle by transferring the energy in the capacitor and the actuators to an inductor (e.g., the same inductor or a second inductor) and then from that inductor back to the power source.

The combined capacitance of the selected actuators and the configurable capacitance, any initial voltage and/or charge on the actuators, the inductance of the inductor and the current induced on the inductor when it is charged determine both the voltage on the actuators after the energy is transferred as well the rate of change (e.g., a time constant) of the voltage and/or charge during the transition as the energy is transferred from the inductor to the capacitor and actuators. In some examples, the capacitor is configured such that the combination of the actuators and the configurable capacitor provide the same combined capacitance for different numbers of actuators. The current that is induced on the inductor is controlled (for example, by varying the time a supply voltage is applied across the inductor and/or selecting a number of parallel inductors to energize) to determine the voltage that is reached after discharge of the energy from the inductor to the capacitor and selected actuators.

In some examples, the capacitance of individual actuators, or of printheads in physically local groups, is estimated (e.g., at manufacturing time or in an adaptive manner during operation) so that the capacitance of a selected group of actuators may be known more accurately, and therefore the capacitor can be configured according to the sum of the estimated capacitances of the selected actuators.

In some examples, non-linear capacitive characteristics and/or hysteresis characteristics of the actuators are accounted for in configuring the capacitance to yield a desired effective capacitance of the configured capacitor and the selected actuators.

In another aspect, in general, an approach to control of an array of piezoelectric actuators (for example, an array of actuators in a piezoelectric inkjet printhead) makes use of an energy transfer approach in which, in each of a series of energizing cycles, energy is first transferred from a power source to a first energy storage element, and then transferred between the first energy storage device and a combination of a selected subset of the actuators and a second energy storage element. The second energy storage element is configurable according to the selected subset of the actuators, optionally further according to states of those actuators prior to the transfer of energy.

In some examples, the first storage element comprises an inductor (or more generally, a network of inductors, or even more generally, an element that stores energy in a magnetic field). The second storage element is a configurable capacitor, for example, a digitally controllable capacitor array.

In some examples, the piezoelectric actuators have capacitive characteristics. More specifically, in some examples, the piezoelectric actuators exhibit non-linear capacitive characteristics and/or hysteresis characteristics.

The transfer of energy between the first energy storage element and the combination of the selected actuators and the second storage element results a change in energy in the actuators and a change in energy in the second storage element. In some examples, a desired change of state of the selected actuators is associated with a desired change in energy of the actuators. The second storage element is configured according to an energy storage capacity of the second storage element such that substantially all of the energy in the first storage element is transferred to the combination of the configured second storage element and the selected actuators such that the selected actuators reach their final state. In some examples, this desired final state is characterized by a desired final voltage across the selected piezoelectric actuators.

In some examples, the initial state and/or final state of each of the selected actuators depends on the voltage and/or charge on the actuator. In some examples, the initial state further depends on a prior history of voltage and/or charge, for example, according to a sign of a rate of change of voltage and/or charge.

In some examples, a desired change of state of the actuators is achieved by one or both of (a) controlling the amount of energy that is stored in the first energy storage element prior to transfer to the second storage element and the selected actuators, and (b) controlling characteristics of the second storage element. For example, controlling the amount of energy in the first energy storage element is accomplished by controlling a time for applying a supply voltage across an inductive first storage element, and/or controlling an inductance of said storage element. Controlling characteristics of the second storage element can, for example, include controlling a total capacitance of said second storage element.

In some examples, a desired rate of change of state is achieved by one or both of (a) controlling the amount of energy that is stored in the first energy storage element prior to transfer to the second storage element and the selected actuators, and (b) controlling characteristics of the second storage element. In some examples, the rate of change of the state is determined by an electrical time constant determined by characteristics of the first storage element and the combination of the second storage element and the selected actuators. In some examples, a combination of an inductance of the first storage element and a combined capacitance of the configured second storage element and the selected actuators characterizes the electrical time constant.

Embodiments of the invention may have one or more of the following advantages.

Among other advantages, driving the piezoelectric elements through an inductance is an intrinsically low-loss method which delivers approximately 95% of the power from the power supply to the piezoelectric elements, limited only by circuit parasitics rather than by circuit topology. Specifically, charging and discharging the print head's load capacitance through dedicated inductors eliminates resistive charging losses and consumes near zero power at idle. Because the print head load capacitance is charged and discharged only through inductors, the only drive circuit losses are due to parasitics—diode voltage drop, transformer winding ESR and leakage inductance losses, and MOSFET switch "on" resistances. This is an improvement over conventional resistive driving methods which may exhibit approximately 90% power loss.

Other features and advantages of the invention are apparent from the following description, and from the claims.

DESCRIPTION

Due to the power losses incurred when driving piezoelectric (e.g., "PZT"—lead zirconate titanate) elements using a resistive drive, there is a need for a low-loss driver for piezoelectric elements. The embodiments described herein implement such a low-loss driver by driving and restoring to rest piezoelectric elements using energy transfer through one or more inductive energy transfer elements.

1 OVERVIEW

Figure 1:
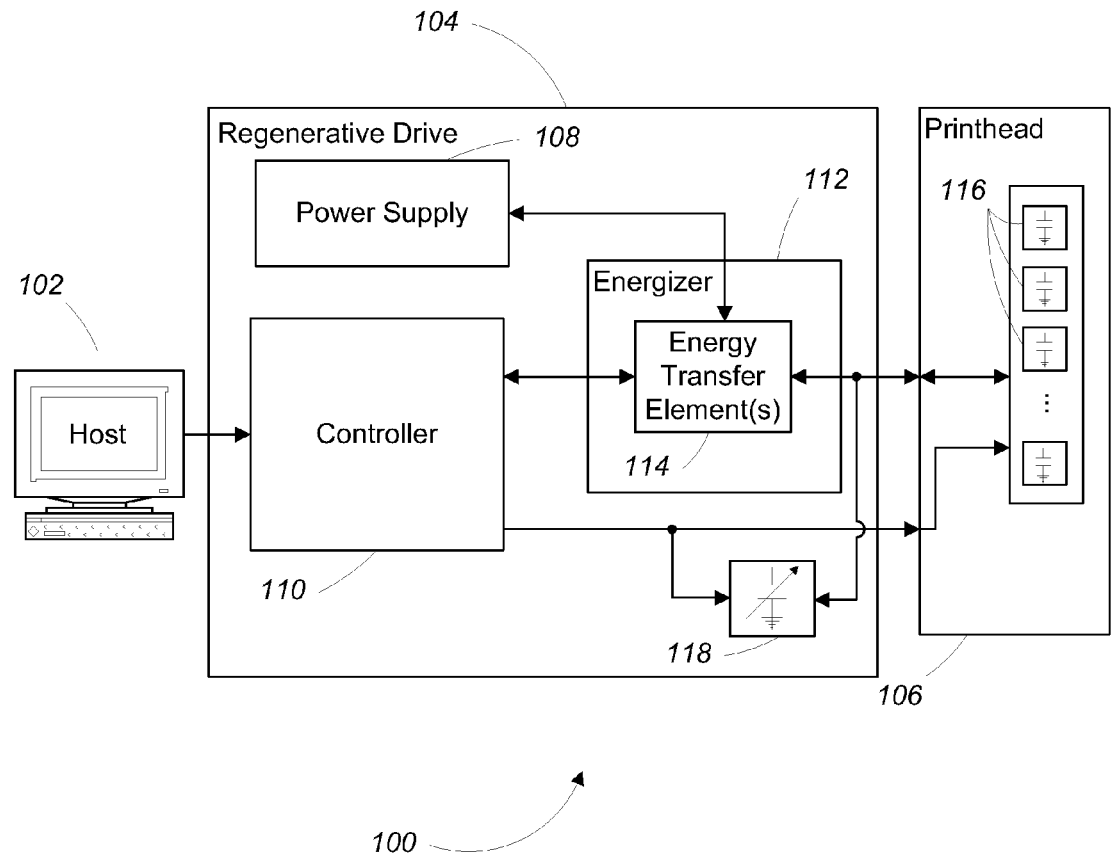
FIG. 1 is a piezoelectric drop on demand printing system including a regenerative drive.

Referring to FIG. 1, a piezoelectric drop on demand (DOD) printing system 100 includes a host 102 (e.g., a general purpose computer), a regenerative drive 104, and a piezoelectric DOD print head 106. The regenerative drive 104 includes a power supply 108, a digital controller 110 (e.g., a microcontroller, an FPGA, or some combination of the two), and an energizer 112. The energizer 112 includes one or more inductive energy transfer elements 114 (e.g., one or more transformers) and a configurable capacitor 118. The print head 106 includes a number (e.g., 1024) of "print jets" 116, each jet 116 including a piezoelectric element which forms a corresponding capacitor.

Very generally, in operation the host 102 provides print data to the controller 110 of the regenerative drive 104. The print data includes a specification of which jets 116 of the print head 106 to enable and a specification of a drive voltage waveform to provide to the jets 116 for the purpose of stimulating the piezoelectric elements of the jets. Based on the print data, the controller 110 configures the print head 106 by enabling certain jets 116, disabling certain other jets 116 and configures the configurable capacitor 118 (as is described in detail below).

The controller 110 then causes generation of the drive voltage waveform by controlling a timing of charging and discharging of the capacitors of the jets 116 via the inductive energy transfer element(s) 114. In some examples, to cause generation of the drive voltage waveform the controller 110 first commences a charge phase in which the inductive energy transfer element(s) 114 is briefly connected to the power supply such that a controlled quantity of energy is transferred from the power supply 108 to the inductive energy transfer element(s) 114 where it is stored as magnetic energy in an inductive element (not shown). With the energy stored in the inductive energy transfer element(s) 114, the controller commences a load phase in which the energy in the inductive element of the inductive energy transfer element(s) 114 is discharged into the capacitors corresponding to the enabled jets 116 and into the configurable capacitor 118. The load phase results in application of a rising edge of the specified voltage waveform to the piezoelectric elements of the jets 116.

After a predetermined amount of time, the controller 110 commences a discharge phase in which the energy stored in the capacitors corresponding to the enabled jets 116 and in the configurable capacitor 118 is transferred back to the inductive energy transfer element(s) 114 where it is stored as magnetic energy in an inductive element. The discharge phase results in application of a falling edge of the specified voltage waveform to the piezoelectric elements of the jets 116. With the energy stored in the inductive energy transfer element(s) 114, the controller 110 commences a recapture phase in which the energy stored in the inductive energy transfer element(s) 114 is recaptured by the power supply 108, accomplishing regeneration.

Figure 2:
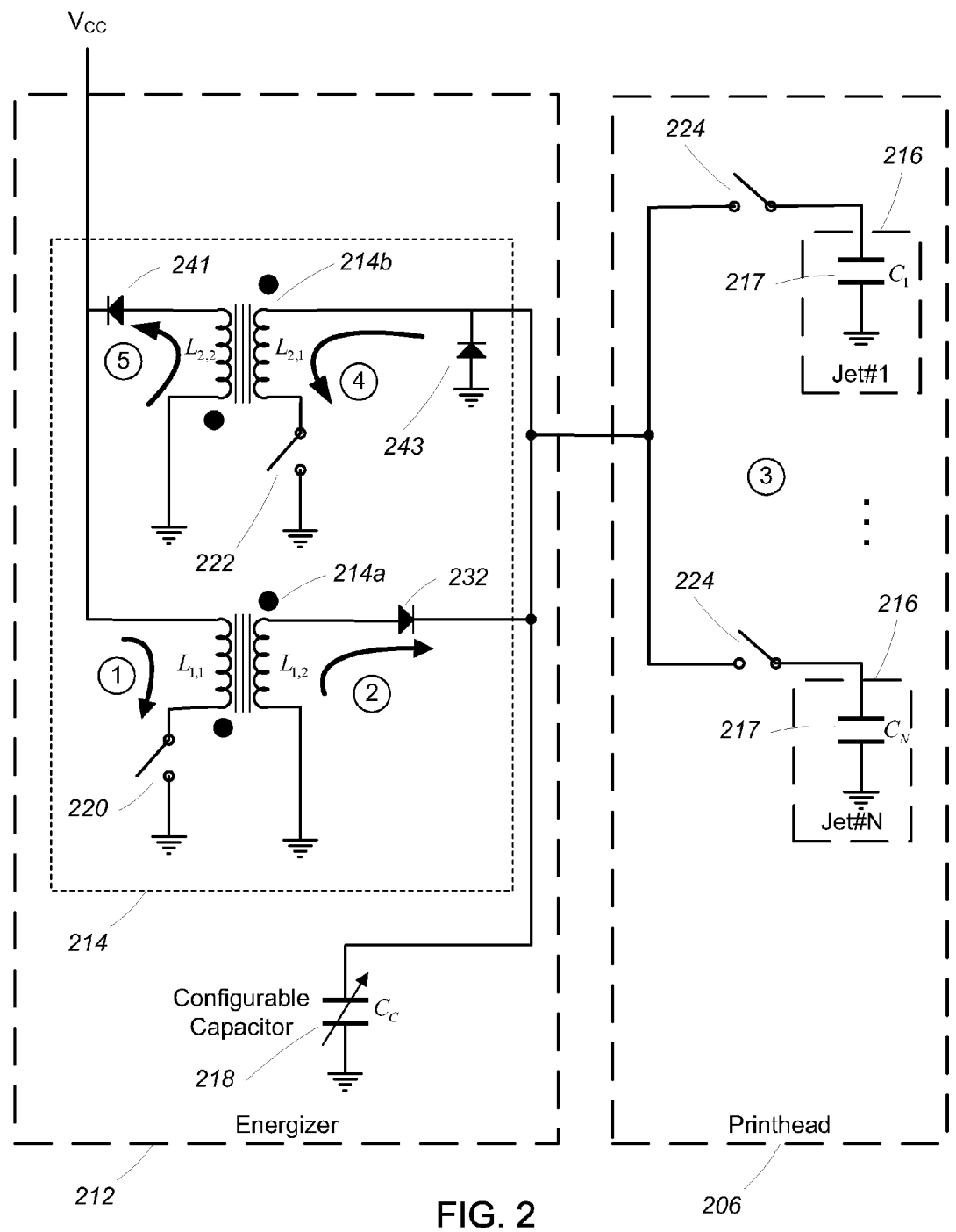
FIG. 2 is a simple example of an energizer and a print head.

Referring to FIG. 2, one example of the energizer 212 includes two inductive energy transfer elements 214: a charge transformer 214a and a discharge transformer 214b. In some examples, the charge transformer 214a and the discharge transformer 214b operate in a manner similar to a standard flyback switching power supply in discontinuous conduction mode.

As was the case in FIG. 1, the print head 206 includes a number (i.e., N) of jets 216, each including a corresponding piezoelectric capacitor 217 ($C_1 \ldots C_N$) and connected in parallel to a configurable capacitor 218 ($C_C$) (e.g., a 10-bit programmable capacitance network).

1.1 Inductive Energy Transfer Elements

The charge transformer 214a includes two windings: a primary winding $L_{1,1}$ and a secondary winding $L_{1,2}$ which are wound around a common core. Any voltages present on the primary and secondary windings are in phase and any currents present on the primary and secondary windings are 180° out of phase. The charge transformer 214a also includes a charge switch 220 (e.g., a field effect transistor (FET) switch) disposed between its primary winding $L_{1,1}$ and ground. In general the charge transformer 214a is used to generate the rising edge(s) of the drive voltage waveform.

The discharge transformer 214b includes two windings (i.e., inductors): a primary winding $L_{2,1}$ and a secondary winding $L_{2,2}$ which are wound around a common core. As is the case with the charge transformer 214a, any voltages present on the primary and secondary windings are in phase and any currents present on the primary and secondary windings are 180° out of phase. The discharge transformer 214*b* also includes a discharge switch 222 (e.g., a FET switch) disposed between its primary winding $L_{2,1}$ and ground, a DC blocking diode 241 (to block DC current flow through the secondary winding $L_{2,2}$), and a commutation diode 243. In general the discharge transformer 214*b* is used to generate the falling edge(s) of the drive voltage waveform.

1.2 Print Jets

Each jet 216 of the print head 206 and its corresponding piezoelectric capacitor 217 is connected in parallel to both the charge transformer 214*a* and the discharge transformer 214*b* through a jet toggle switch 224. In some examples, the jet toggle switches 224 are implemented as FET devices within ASIC(s). In some examples, the print head 206 includes many jets, for example, in the range of 128 to 4096, with the same number of corresponding piezoelectric capacitances and associated switches. In some examples, the individual piezoelectric capacitances are in the range of 50 pF to 1 nF.

1.3 Configurable Capacitor

The configurable capacitor 218 is connected to both the charge transformer 214*a* and the discharge transformer 214*b*, and is connected in parallel to the piezoelectric capacitors 217 of the jets 216. As is noted above, in some examples the configurable capacitor 218 is a 10-bit capacitor network which is capable of being configured within a range of capacitances which encompasses a worst case capacitance of the print head 206 when operating at a maximum intended temperature (i.e., a point of maximum jet capacitance). In some examples, the ten control bits of the configurable capacitor 218 are divided functionally into a three-bit coarse valued network, a three-bit mid valued network, a three-bit fine valued network, and a final smallest capacitor. The mid value, fine value, and smallest networks have a capacitance which is about 40% greater than a standard binary progression to allow for capacitor tolerance variations. In some examples, each of the three-bit networks has a guaranteed monotonic operation but the individual networks do not match well to form a single 10-bit monotonic binary network.

The effective capacitance of the configurable capacitor 218 is measured during fabrication at each of the 10-bit control values using an external capacitance meter with a few volts of DC bias setting. The table of 1024 (i.e., $2^{10}$) resulting capacitance values is then sorted by an external algorithm. The algorithm selects a subset of capacitance values from this list (e.g. 512 values) which represent a best fit straight line to a linear capacitance progression ranging from a maximum capacitance value (i.e., all bits on) to a minimum capacitance value (i.e., all bits off). Due to the tolerances of the capacitors used in the configurable capacitor 218 and available component choices, the fit to a straight line is generally imperfect. In some examples, codes appear out-of-order and some may even be duplicated. In some examples, the table of capacitance values has a precision in the range of an 8.4-8.8 bit capable configurable capacitor 218, depending on individual capacitor tolerance. However, in some examples, the configurable capacitor 218 includes approximately 40% extra total capacitance range to allow for print head capacitance variation at manufacture and with temperature. This extra capacitance range reduces the usable precision of the configurable capacitor 218 to approximately 7.9-8.3 bits. In some examples, the configurable capacitor 218 has better than 1% adjustability within its working range.

In some examples, all of the capacitors used in the configurable capacitor besides the smallest capacitor are polyethylene naphthalate (PEN) film type capacitors. PEN film type capacitors track each other well with temperature variation, eliminating a need to re-linearize the configurable capacitor 218 due to temperature variation. In other examples, temperature-compensated capacitors (NPO/COG) are used. In some examples, the individual elements of configurable capacitor 218 are located in a vicinity of each other to ensure that they are at similar temperatures.

In some examples, a table of 512 10-bit configuration codes for the configurable capacitor is generated from the straight line capacitance fit described above. The table is provided to the controller 110 which stores the table for future use as a linearization table for the configurable capacitor. The maximum capacitance value of the configurable capacitor 218 (i.e., the capacitance value when all 10 bits of the configuration code are set to 1) is also provided to and stored by the controller as a factory measured constant referred to as "ConfigMaximum" (in nF). ConfigMaximum is used to accurately report the measured equivalent capacitance of the print head 206, at a chosen voltage state, to the host 102.

2 OPERATIONAL DETAIL

In general, the energizer 212 and the print head 206 are operated by the controller 110 such that the energizer 212 provides a waveform including a series of pulses having shapes specified by the host 102 to the print head 206. In some examples, for each pulse, the energizer 212 and print head 216 are cycled through an initialization phase (I) and five energy transfer phases which are labeled (1)-(5) in FIG. 2. In other examples where more complex, composite pulse shapes (e.g., a short trapezoid on top of a longer trapezoid) are used, more than five phases per pulse are required.

In the initialization phase, the controller 110 receives an encode trigger 356 from an encoder (not shown) indicating a print request from the host 102. The controller 110 subsequently sends a command to the print head 206 which causes a first subset of jets 216 to be enabled (i.e., to have their jet toggle switches 224 closed) and causes a second subset of the jets 216 to be disabled (i.e., to have their jet toggle switches 224 opened). In some examples, the command from the controller 110 is based on print data received from the host 102.

Since each of the jets 216 has a corresponding piezoelectric capacitor 217, enabling different numbers of jets 216 causes the overall capacitance connected to the inductive charge transfer element(s) 214 due to the jets 216 to vary. Without compensating for this varying capacitance, the drive voltage waveform provided to the jets 216 would deviate from the desired drive voltage waveform specified by the print data. For example, the slew rate of the drive voltage waveform and the final voltage of the drive voltage waveform may deviate from a desired slew rate and a desired voltage. To compensate for the varying capacitance presented by the jets 216, the configurable capacitor 218 is connected in parallel to the piezoelectric capacitors 217 of the jets 216. In general, for each pulse in the drive voltage waveform, the configurable capacitor 218 is configured such that the sum of the capacitance of the enabled jets 216 and the capacitance of the configurable capacitor 218 is maintained at an approximately constant capacitance value regardless of the number of enabled jets 216.

To configure the configurable capacitor 218 the controller 110 calculates a 9-bit address lookup into the table of 512 10-bit configurable capacitor configuration codes and uses the address to retrieve the 10-bit configuration code corresponding to the address. The 10-bit configuration code is applied to a control line of the configurable capacitor 218 whereby the capacitance of the configurable capacitor 218 is configured. In some examples, the address calculated by the controller 110 has different number of bits based on the number of elements in the table (e.g., 10 bits for 1024 elements or 8 bits for 256 elements).

The controller 110 dynamically calculates the 9-bit address lookup for each pulse of the waveform using the equation:

ConfigAddress=ConfigCoefficient*(NumJets−NumEnabledJets)

where NumJets is the total number of jets 216 included in the print head 206 and NumEnabledJets is the number of jets 216 that are enabled for the current pulse. ConfigCoefficient depends on the particular print head 206 and configurable capacitor 218. For NumJets=1024, for a typical printhead and corresponding circuit design, ConfigCoefficient ranges from a typical value of approximately 330/1024 up to a maximum value of 511/1024. In general, ConfigCoefficient controls the amount of the total range of the configurable capacitor 218 that is used to compensate for varying print head jet capacitance.

The controller 110 initially calculates the ConfigCoefficient value based on system power-up self-calibration trials. The ConfigCoefficient value is periodically (e.g., during each initialization phase) adjusted during operation such that the capacitance of the configurable capacitor 218 when zero print head jets 216 are enabled is approximately equal to the sum of the capacitance of jets 216 when all of the jets 216 are enabled.

The ConfigAddress is calculated for each pulse of the drive voltage waveform according to the above equation. Mapping ConfigAddress through the capacitance linearization table to the configurable capacitor 218 causes the configurable capacitor 218 to add an appropriate amount of capacitance to the overall print head capacitance, $C_{total}$ (i.e., the sum of the enabled jet capacitance and the configurable capacitor capacitance), thereby maintaining a generally-constant overall load capacitance. In some examples, in order to optimize fluid jetting the overall load capacitance is allowed to deviate from the generally constant capacitance. In practice, since the capacitances associated with the jets 216 vary with applied voltage, a constant overall capacitance may only be achieved at one or two points during the generation of the drive waveform.

In some examples, the control lines of the configurable capacitor 218 are updated by the controller 110 simultaneously with the controller 110 enabling and disabling the individual jets 216 of the print head 206. In some examples, since the table of configuration codes for the configurable capacitor 218 is linearized, a side effect of calculating ConfigCoefficient is that the print head's effective capacitance with all jets 216 enabled is equal to the capacitance value calculated by the equation: ConfigMaximum*ConfigCoefficient*NumJets. This capacitance value may be reported by the system to the host 102 for diagnostic and experimental purposes.

Figure 3:
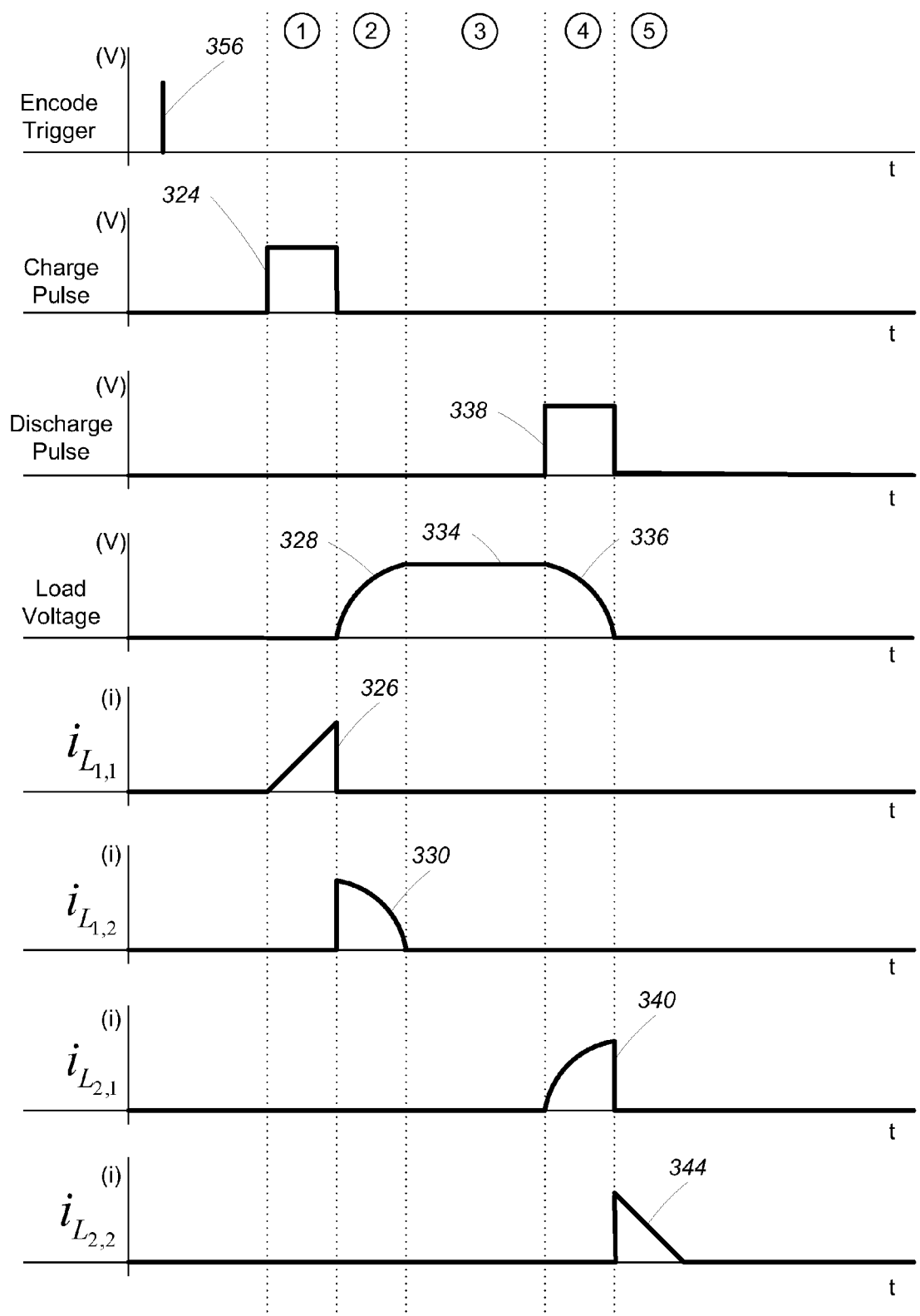
FIG. 3 is a simple timing diagram illustrating the energy transfer between the energizer and print head of FIG. 2.

Continuing to refer to FIG. 2 and also referring to FIG. 3, with the jets 216 enabled and the configurable capacitor 218 configured, the controller 110 commences a first stage (1) in which energy is transferred from the power supply 108 to the charge transformer 214a. In the first stage, the controller 110 provides a controllable width charge command pulse 324 to the charge switch 220, causing the charge switch 220 to close for a controllable time interval.

While the charge switch 220 is closed, the current in the primary winding $L_{1,1}$ of the charge transformer 214a rises in a linear manner at a rate determined by the power supply voltage $V_{CC}$ divided by the inductance, L, of the primary winding of the charge transformer 214a as follows:

$$I(t) = t\frac{V_{CC}}{L}$$

The linear rise of the current in the charge transformer's primary winding represents an amount of stored energy growing in time with the square of the length of the charge command pulse 324:

$$E(t) = \frac{1}{2}LI(t)^2 = \frac{1}{2L}V_{CC}^2 t^2$$

While the current in the charge transformer's primary winding is increasing, a charging diode 232 prevents formation of an opposing current in the charge transformer's secondary winding.

At the falling edge of the charge command pulse 324 a second phase (2) commences in which the charge switch 220 opens and the energy stored in the primary winding $L_{1,1}$ of the charge transformer 214a is transferred through the secondary winding $L_{1,2}$ of the charge transformer 214a and the diode 232 into the capacitors of the combined capacitive load of the print head 206 (i.e., the piezoelectric capacitors 217 of the enabled jets 216) and the configurable capacitor 218. The transfer of energy into the combined load causes the voltages on the piezoelectric capacitors 217 of the enabled jets 216 to rise in the form of the first quarter-cycle of a quasi-sine wave 328. The current on the secondary winding $L_{1,2}$ of the charge transformer 214a simultaneously declines in the form of a first quarter-cycle of a quasi-cosine wave 330 (both waveforms are only quasi-sine or cosine, rather than pure sine or cosine, due to the nonlinear charge-to-voltage characteristics of the jet effective capacitance). If the piezoelectric capacitors 217 of the enabled jets 216 and the configurable capacitor 218 are linear, the fundamental period of the rising edge of the voltage waveform 328 (and the falling edge of the current on the secondary winding $L_{1,2}$ of the charge transformer 214a) is $2\pi\sqrt{LC_{total}}$ where L is the charge transformer's inductance (e.g., 35 uH) and $C_{total}$ is the combined capacitance of the print head 206 and configurable capacitor 218.

The energy which was stored in the primary winding of the charge transformer 214a is nearly completely transferred to the capacitors 217, 218, resulting in a total energy of (½) $C_{total}V^2$ being stored on the capacitors 217, 218.

Since the above-described charge event adds a controlled amount of energy to the capacitors 216, 217 of the print head 206, the charge command pulse width calculation must take the starting voltage of the capacitors 216, 217 into account. From an initial voltage $V_0$, production of a final voltage $V_1$ requires a charge command pulse of length $T_{CHARGE}$:

$$T_{CHARGE} = \sqrt{LC_{total}}\frac{\sqrt{V_1^2 - V_0^2}}{V_{CC}}$$

where, neglecting component parasitic losses, $V_{CC}$ is the power supply voltage, L is the inductance of the primary winding of the charge transformer 214a and $C_{total}$ is the effective print head capacitance plus configurable capacitor capacitance.

Rescaling time in terms of clock cycles of the controller 110 gives:

$$N_{CHARGE} = F_{CLOCK}\sqrt{LC_{total}}\frac{\sqrt{V_1^2 - V_0^2}}{V_{CC}}$$

where $N_{CHARGE}$ is the charge command pulse length measured in clock cycles of the controller, and $F_{CLOCK}$ is the controller's clock frequency (e.g., 62.5 MHz). In some examples, the peak voltage attained on the piezoelectric capacitors 217, when starting from zero volts, is roughly 20 volts per microsecond of charge time.

In some examples, the effective capacitance of the print head 206 changes with fire pulse target voltage and also separately with voltage history (i.e., the magnitude and direction of prior charge and discharge operations for each jet 216). In particular, jet 216 may have a different on/off history through the progress of a multi-pulsed grayscale waveform.

To accommodate the capacitance variation of the jets with voltage, for every charging event in the original voltage waveform specification, the controller 110 calculates an amount of energy $E_{CC}(v)$ required to charge the chosen maximum capacitance of the configurable capacitor 218 to the desired final voltage V, and separately calculates the energy $E_{JETS}(v)$ required to charge the print head's all-on jets capacitance to the same final voltage. During printing, the two energy values are scaled in the controller 110 by an instantaneous "enabled" jet count fraction, and summed as follows:

$$E_{TOT} = DE_{JETS} + (1-D)E_{CC}$$

where $E_{TOT}$ is the total required charge energy and D is the instantaneous jet "enabled" fraction (i.e., the count of currently enabled jets in the print head divided by the total number of jets in the print head; a real number ranging from 0 to 1). The term (1−D) is used to compute a complementary portion of the chosen maximum capacitance of the configurable capacitor to achieve an energy input requirement for this charging event which is approximately independent of the number of jets enabled at the charging event.

The controller 110 then calculates the required charge command pulse length in system clock periods as follows:

$$N_{CHARGE} = F_{CLOCK}\sqrt{2LE_{TOT}}/V_{CC}$$

To reduce controller hardware resource requirements and to scale to integer values, the controller 110 calculates scaled quantities $P_{JETS}$ and $P_{CC}$ from $E_{JETS}$ and $E_{CC}$:

$$P_{JETS} = E_{JETS}F_{CLOCK}^2 2L$$

$$P_{CC} = E_{CC}F_{CLOCK}^2 2L.$$

The controller then calculates:

$$P_{TOT} = DP_{JETS} + (1-D)P_{CC}$$

The controller 110 then calculates the charge command pulse length (in system clock cycles) as:

$$N_{CHARGE} = \sqrt{P_{TOT}}/V_{CC}$$

In general, the above total energy calculations work well for non-grayscale drive voltage waveforms, or grayscale drive voltage waveforms which have relatively uniform pulse voltages so that the voltage history for each jet 216 is similar and can be compensated for during the microcontroller's calculation of the single value $E_{JETS}$.

In some examples, when different jets have different voltage histories, an extension of the preceding total energy calculation is used. In particular, the previously described nonzero gray-level setting of each jet 216 is stored by the controller 110 and is used along with the current gray level of each jet. The previous nonzero and current gray levels together (4 discrete levels or 2 bits each for example) determine the energy requirement for a given jet at each charge command pulse.

In one example, there are 4×4=16 possibilities for combined current and previous voltage histories. The total number (i.e., count) of jets which belong to each of the sixteen voltage history groups are calculated into 16 jet history count buckets. A table, filled by the controller 110, lists the amount of charge energy required for a jet 216 to reach the target voltage for each of the 16 voltage history possibilities. The 16 required charge energies in the table are individually multiplied (i.e., weighted) by the number of jets 216 which belong to their corresponding history group (i.e., the count in each of the 16 history buckets), and the results of the multiplications are summed to a weighted total energy. The weighted total jet energy plus the energy required to charge a complementary portion of the configurable capacitor to the same target voltage is used as the required charge energy for the print head (i.e., $E_{TOT}$) for the current charge cycle. The count in each of the 16 history buckets of jet history is stored by the controller charge transfer cycle for future readback as a data point for analysis by the controller 110.

In some examples, if the drive voltage waveform shape does not include a specialized pulse which is supplied to all jets at a printed gray level of zero (e.g., a Meniscus Control or Tickle pulse), then the last nonzero gray level for each jet is stored rather than the last gray level, since zero gray level pulses do not modify the jet's voltage history.

In some examples, groups of piezoelectric capacitors 217 in different locations on the print head 216 have differing charge-to-voltage properties. In such examples, a bucket of counts of energized jets can be maintained for each group of piezoelectric capacitors 217. A required amount of energy can then be calculated for each group rather than for individual jets.

In some examples, typical charge command pulse lengths are in a range around a nominal value of 6 microseconds (about 384 system clocks) to create a 130 v drive pulse, depending on 48 v supply voltage, component tolerances, and actual print head capacitance at the operating temperature.

In some examples, rather than calculating a charge command pulse length to achieve a certain energy level (and a certain peak current) in the first energy storage element, a calculation of a desired peak current may first be made for the first energy storage element. The first energy storage element is then charged through a current-sensing circuit to that controlled peak current.

In some examples, it is important that the actual jet excitation voltage (the leading edge of the drive voltage waveform's trapezoid pulse) starts very soon after the host printing system's writing encoder trigger 356, or a fixed delay time after the encoder trigger 356, or preferably a variable adjustment period after the encoder trigger 356 which automatically adjusts in length with encoder period (e.g., a constant sub-pixel delay). Since the drive voltage waveform starts to rise only after the end of the charge command pulse, and the charge command pulse is of variable length, the drive voltage waveform can not start immediately after the encoder trigger 356. Instead, the start of the drive voltage waveform is delayed a fixed amount of time by control logic, or preferably a fixed sub pixel delay time which automatically scales with printing speed (i.e., a fixed fraction of the writing encoder period). The first charge command pulse is scheduled by control logic to end at the end of the delay period to start the drive voltage waveform transitions at the proper time. This delay period is longer than the longest anticipated charge command pulse including all tolerances. In some examples, the delay period is longer than 9 microseconds.

In a third phase (3), the peak voltage 334 remains stored on the print head capacitance 217 and configurable capacitor 218 until a discharge event occurs.

After a predetermined amount of time, the controller 110 commences a fourth charge transfer stage (4) in which the peak voltage 334 on the piezoelectric capacitors 217 of the jets 216 and the configurable capacitor 218 is discharged using the discharge transformer 214b. This discharge of voltage into the discharge transformer 214b causes a falling edge 336 in the drive voltage waveform.

To begin the fourth charge transfer stage, the controller 110 issues a discharge command pulse 338 of controllable width to the discharge switch 222 of the discharge transformer 214b, causing the discharge switch 222 to close. When the discharge switch 222 closes, the voltage on the capacitors 217, 218 declines toward zero volts in the form of the first quarter-cycle of a quasi-cosine wave. The current in the primary winding $L_{2,1}$ of the discharge transformer 214b simultaneously rises in the form of the first quarter-cycle of a quasi-sine wave 340. For an ideal (i.e., linear) total print head capacitance, the fundamental period of both the falling print head capacitor voltage and the rising primary winding current is $2\pi\sqrt{LC_{total}}$ where L is the inductance of the primary winding of the discharge transformer 214b (e.g., 35 uH) and $C_{total}$ is the total capacitance of the print head (e.g., about 145 pF*1024 jets). In some examples, the period is approximately 14 microseconds depending on print head parameters, temperature and component tolerances. The actual falling edge duration is one-quarter of that full period.

In some examples, not all of the voltage stored on the capacitors 217, 218 is discharged. For example, For an ideal print head capacitance, the actual final voltage $V_1$ may be expressed as a function of initial voltage $V_0$ and discharge command pulse length t (in seconds):

$$V_1 = V_0 \cos\left(\frac{t}{\sqrt{LC}}\right)$$

Solving for discharge command pulse length t (seconds):

$$t = \sqrt{LC} \arccos\left(\frac{V_1}{V_0}\right)$$

Rescaling time in terms of system clock periods gives:

$$Q_D = F_C \sqrt{LC} \arccos\left(\frac{V_1}{V_0}\right)$$

where $Q_D$ is the discharge command pulse length measured in system clock periods, and $F_C$ is the system clock frequency (e.g., 62.5 MHz).

In some examples where the voltage on the capacitors 217, 218 is completely discharged, once the voltage has fallen past zero volts, a commutation diode 243 connected across the capacitors 217, 218 begins to conduct and maintains the current accumulated on the discharge transformer's primary winding, clamping the voltage on the capacitors 217, 218 to near zero until the discharge switch 222 is opened. In general, the commutation diode 243 allows the discharge switch 222 to be opened at a time after the voltage of the capacitors 217, 218 has reached zero volts rather than requiring that the discharge switch 222 is opened exactly when the voltage of the capacitors 217, 218 equals zero volts. In this way, the commutation diode 243 simplifies the timing requirements for the discharge switch 222. In some examples, commutation diode 243 is not included in the energizer circuit 212.

At the end of the discharge command pulse 338, the energy stored in the primary winding of the discharge transformer 214b is transferred back into the power supply 108 via the secondary winding $L_{2,2}$ of the discharge transformer 214b in the form of a linear ramp down to zero current 344. Due to the presence of the commutation diode 243, the discharge command pulse 338 width may be a fixed duration if the goal is to always discharge the capacitors 217, 218 to zero volts (i.e., such a discharge takes a fixed amount of time regardless of the starting voltage, and in practice the discharge command pulse 338 may have a duration fixed at, for example, 20% longer than a quarter of the approximate 14 microsecond fundamental period to allow for tolerances).

In some examples, the PZT capacitances associated with the jets 216 vary with applied voltage and voltage history, so the above equations are an approximation.

3 ADDITIONAL FEATURES

Figure 4:
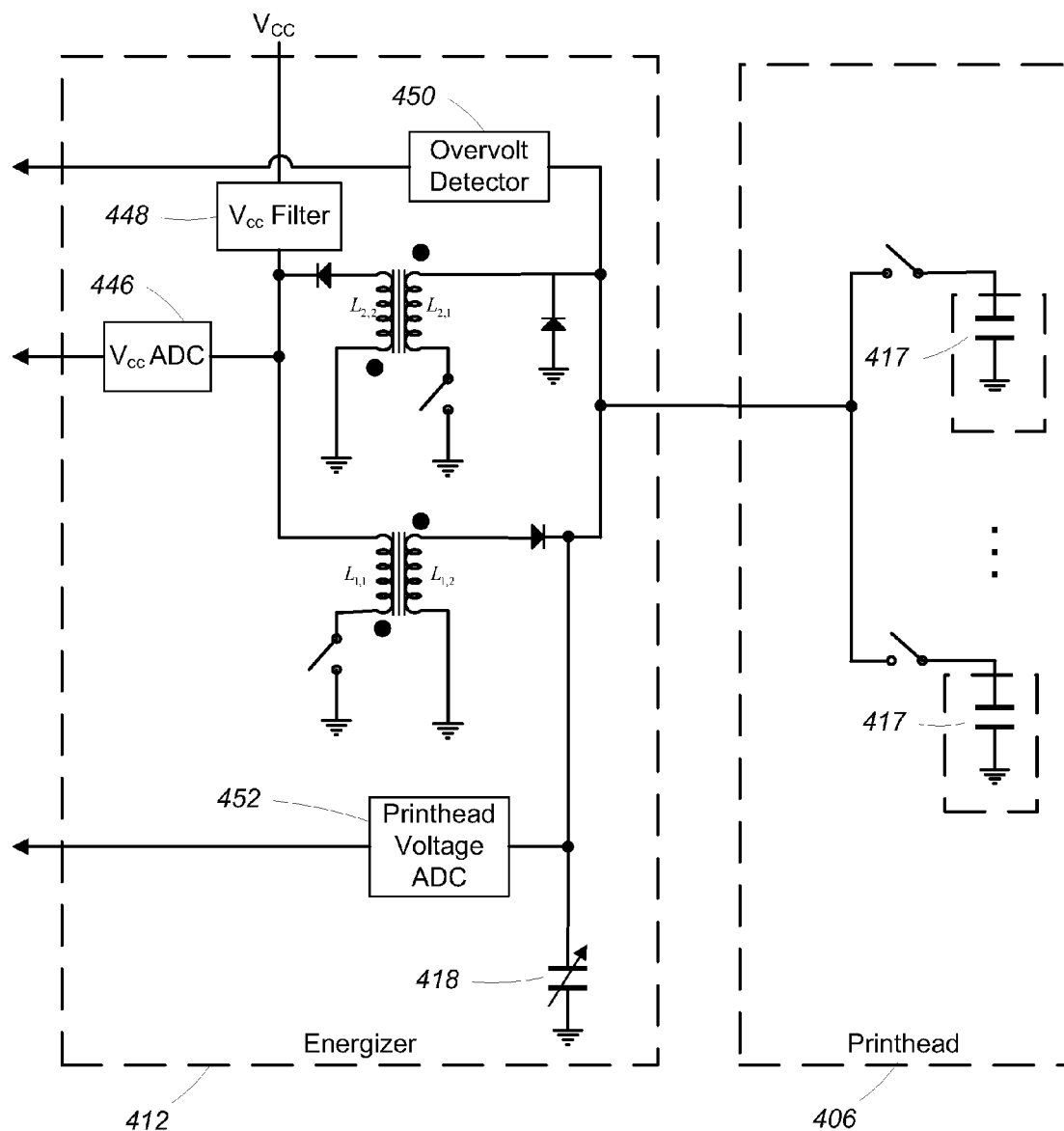
FIG. 4 is a detailed view of the energizer and print head of FIG. 3, including a number of additional elements.

Referring to FIG. 4, a more detailed diagram of the energizer 412 and the print head 406 includes a power supply filter 448, a power supply analog to digital converter (ADC) 446, a print head voltage ADC 452, and an overvoltage detector 450.

The power supply filter 448 receives input from the power supply 108 and applies a filter (e.g., an analog L-C low pass filter) to limit the rate of voltage variation presented to the energizer 412, present a well-controlled and damped impedance to the energizer 412, and serve as a reservoir for charge and discharge current pulses, attenuating them before they exit the energizer 412 through the power supply cabling. The characteristic of the power supply filter 448 depends on the equivalent series resistance provided by its series inductor and fuse to damp the resulting L-C-R network response. Input power to the energizer 412 is limited (e.g., less than 250 mA DC may be consumed under any printing circumstance), so the filter inductance is physically quite small. In one example, five 22 uF 63 v ceramic capacitors may be used.

The power supply ADC 446 and the print head voltage ADC 452 are included to allow for accommodation of power supply variation in real time, self-calibration for print head and component tolerances, and drift of print head capacitance with temperature. In some examples, due to the need for real-time measurement, ADC total aperture and conversion time of one microsecond or less is required.

The power supply ADC 446 measures the voltage of the power supply 108 coming out of the power supply filter 448 immediately before each charge command pulse is generated. The measured voltage is used to compensate (e.g., in hardware) the subsequent charge command pulse length for the effects of power supply variation. It is important to measure the instantaneous power supply voltage just before each charge command pulse is generated since the measured voltage and the power supply input filter's frequency response together provide the only immunity to power supply voltage variation. The power supply voltage readings from this ADC are also compared against upper and lower voltage limits by the controller 110. The controller uses the result of the comparison to signal a supply voltage out-of-range error to the host 102.

In some examples, each reading from the power supply ADC 446 is stored in a dedicated hardware register in the controller. The register can be read for the purpose of reporting the power supply voltage to the host 102.

In some examples, the controller 110 includes a voltage compensation table which is indexed using possible values of the power supply voltage. The power supply voltage stored in the register can be supplied to the compensation table to retrieve a compensation value. The compensation value is the inverse of its address in the compensation table at every entry (i.e., 1/PowerSupplyVoltage). The compensation value is provided to a multiplier which performs a final adjustment to the charge command pulse width to null out the effect of changing power supply voltage, since the desired charge command pulse length varies inversely with power supply voltage.

In some examples, an ADC may be used to directly measure the peak current achieved in the first storage element for later use by the controller 110 to calculate and predict optimum charge control timing values for subsequent operations.

The print head voltage ADC 452 measures the instantaneous voltage stored on the combined load of the print head and configurable capacitors 417, 418 after each charge and discharge event. The print head voltage ADC measures drive pulse amplitudes as the drive voltage waveform progresses in real time for software self-calibration of the energizer 412. Besides its main use for tuning of the energizer 412, the print head voltage ADC 452 also allows real-time detection of unexpected load conditions (e.g., a missing print head, or a printhead containing defective (short-circuited or open-circuited) piezoelectric capacitors which could result in the calculated ConfigCoefficient value falling outside of a permissible range or changing too rapidly.

In some examples, the print head voltage ADC 452 takes readings before each charge command pulse begins, just before each charge command pulse ends, just before each subsequent discharge command pulse begins, and just after each subsequent discharge command pulse ends for each drive pulse. In some examples, the readings are stored in a FIFO stack along with the jet "enabled" count (for 1-bit operation) or 16-bucket jet history counts (for 2-bit grayscale operation) for later read-back and regression analysis by the controller 110.

In some examples, the controller 110 uses the stored measurement results to periodically recalculate and adjust the working estimate of the ConfigCoefficient variable and the charge energy to voltage curves for the jet capacitances 217 and the configurable capacitance 218. In some examples, if the controller 110 can not keep up with the actual firing frequency of the drive voltage waveform, regression analysis is performed on a sampling of the waveform data. For example, the waveform data is sampled periodically to gather data points which represent printing with many print head jets enabled and few print head jets enabled over the range of possible drive waveform voltages and voltage histories. This allows the controller 110 to extract separate charge energy requirements for the configurable capacitor's ordinary capacitance and for the nonlinear effective capacitance of the jets 216 at the waveform voltages in use at the time.

The overvoltage detector 450 limits the maximum peak voltage supplied to the print head 406 under fault conditions to avoid damaging the print head 406. In some examples, the voltage is limited to approximately 150 volts. In some examples, the overvoltage detector 450 includes an NPN transistor which signals the controller 110 when an output overvoltage has been detected. The controller 110 latches this error and shuts the energizer 412 down by ceasing issuance of charge command pulses.

In some examples, since the effective capacitance of the jets of the print head varies with voltage and voltage history, but the configurable capacitor's capacitance does not, the practice of "matching" the configurable capacitance against the effective capacitance of the jets of the print head is not straightforward. In some examples, a value of ConfigCoefficient may be chosen to match energy input to jets of the print head and the configurable capacitor at a specific voltage and history point (e.g. to charge from 0 to 100V after a recent discharge from 100V to 0V). Alternatively, ConfigCoefficient may also be chosen to have the configurable capacitor 218 charge/discharge time constant match either the print head capacitance charge or discharge time constant, but generally not both. Instead, through jetting characterization, the value of ConfigCoefficient would be chosen to stabilize jetting characteristics, maintaining constant drop volume and time of flight with varying print head energized jet count.

4 ALTERNATIVES

In some examples, the inductive energy transfer element 114 may include only a single transformer which both charges and discharges the print head capacitors.

In some examples, inductive energy transfer elements other than transformers are used to charge and discharge the print head capacitors. For example, a pair of two-terminal inductors could be used, or a single two-terminal inductor.

The drive voltage waveform described above includes a series of isolated trapezoidal pulses. However, in some examples, more complex pulse shapes such as a series of several closely-spaced varying-amplitude pulses, or pulses formed of a combination of stacked trapezoids (stepped pulses) are used.

It is to be understood that the foregoing description is intended to illustrate and not to limit the scope of the invention, which is defined by the scope of the appended claims. Other embodiments are within the scope of the following claims.

What is claimed is:

1. A method for regenerative driving of one or more transducers comprising:

for each of a plurality of driving cycles,
enabling one or more of the plurality of transducers for driving and disabling one or more of the plurality of transducers, resulting in a number of enabled transducers;
configuring a configurable capacitive energy storage element based on the number of enabled transducers to achieve a desired overall capacitance, the desired overall capacitance comprising a sum of the capacitances of the one or more enabled transducers and the capacitance of the configurable capacitive energy storage element;
transferring a predetermined quantity of energy from a power supply to a first inductive energy transfer element;
distributing the predetermined quantity of energy from the first inductive energy transfer element, to the configurable capacitive energy storage element and to one or more capacitive energy storage elements of a plurality of capacitive energy storage elements, each energy storage element of the plurality of energy storage elements being coupled to an associated transducer;

transferring energy from the one or more capacitive energy storage elements and from the configurable capacitive energy storage element to a second inductive energy transfer element; and transferring energy from the second inductive energy transfer element to the power supply.

2. The method of claim 1 wherein the first inductive energy transfer element and the second inductive energy transfer element are the same element.

3. The method of claim 1 wherein the configurable capacitive energy storage element includes a plurality of selectable capacitors and configuring the configurable capacitive energy storage element includes selecting certain capacitors of the plurality of selectable capacitors based on a set of configuration bits.

4. The method of claim 1 further comprising determining the predetermined quantity of energy based on a desired voltage for application to the number of enabled transducers.

5. The method of claim 4 further wherein determining the predetermined quantity of energy and configuring the configurable capacitive energy storage element is based on a desired rate of change of the desired voltage for application to the number of enabled transducers.

6. The method of claim 4 wherein determining the predetermined quantity of energy includes accounting for a history of prior voltages applied to the number of enabled transducers.

7. The method of claim 1 wherein transferring the predetermined quantity of energy from the power supply to the first inductive energy transfer element includes transferring the predetermined quantity of energy to a first two-terminal inductor and transferring the energy from the second inductive energy storage element to the power supply includes transferring the energy from a second two-terminal inductor to the power supply.

8. The method of claim 7 wherein the first two-terminal inductor and the second two-terminal inductor are the same two-terminal inductor.

9. The method of claim 1 wherein each of the plurality of transducers includes a piezoelectric element.

10. The system of claim 9 wherein the first inductive energy transfer element and the second inductive energy transfer element are the same element.

11. The system of claim 9 wherein the configurable capacitive energy storage element includes a plurality of selectable capacitors and the controller is configured to configure the configurable capacitive energy storage element including selecting certain capacitors of the plurality of selectable capacitors based on a set of configuration bits.

12. The system of claim 11 wherein the controller is configured to determine the predetermined quantity of energy including accounting for a history of prior voltages applied to the number of enabled transducers.

13. The system of claim 9 wherein the controller is configured to determine the predetermined quantity of energy based on a desired voltage for application to the number of enabled transducers.

14. The system of claim 13 wherein the controller is configured to determine the predetermined quantity of energy and configure the configurable capacitive energy storage element based on a desired rate of change of the desired voltage for application to the number of enabled transducers.

15. The system of claim 9 wherein the first inductive energy transfer element includes a first two-terminal inductor, the second inductive energy transfer element includes a second two-terminal inductor, and the controller is configured to transfer the predetermined quantity of energy from the power supply to the first two-terminal inductor and transfer the energy from the second two-terminal inductor to the power supply.

16. The system of claim 15 wherein the first two-terminal inductor and the second two-terminal inductor are the same two-terminal inductor.

17. The system of claim 9 wherein each of the plurality of transducers includes a piezoelectric element.

18. A method for regenerative driving of one or more transducers comprising:

for each of a plurality of driving cycles, enabling one or more of the plurality of transducers for driving, resulting in a number of enabled transducers;

configuring a configurable capacitive energy storage element based on the number of enabled transducers and a desired overall capacitance;

transferring a predetermined quantity of energy from the power supply to a first inductive energy transfer element including transferring the predetermined quantity of energy to a primary winding of a first transformer, distributing the predetermined quantity of energy from the first inductive energy transfer element to the configurable capacitive energy storage element and to the one or more capacitive energy storage elements of a plurality of capacitive energy storage elements, each energy storage element of the plurality of energy storage elements being coupled to an associated transducer, including distributing the predetermined quantity of energy from the primary winding of the first transformer, via a secondary winding of the first transformer, transferring energy from the one or more capacitive energy storage elements and from the configurable capacitive energy storage element to a second inductive energy transfer element including transferring the energy from the one or more capacitive energy storage elements and from the configurable capacitive energy storage element via a primary winding of a second transformer, and transferring energy from the second inductive energy storage element to the power supply including transferring the energy from the primary winding of the second transformer, via a secondary winding of the second transformer, to the power supply.

19. The method of claim 18 wherein the first transformer and the second transformer are flyback transformers operating in discontinuous conduction mode.

20. A system for regenerative driving of one or more transducers comprising:

a plurality of transducers;

a configurable capacitive energy storage element;

a first inductive energy transfer element;

a second inductive energy transfer element; and a controller for operating the system through a plurality of driving cycles, the controller configured to, for each of the plurality of driving cycles, enable one or more of the plurality of transducers for driving and disable one or more of the plurality of transducers, resulting in a number of enabled transducers;

configure the configurable capacitive energy storage element based on the number of enabled transducers to achieve a desired overall capacitance, the desired overall capacitance comprising a sum of the capacitances of the one or more enabled transducers and the capacitance of the configurable capacitive energy storage element;

transfer a predetermined quantity of energy from a power supply to the first inductive energy transfer element;

distribute the predetermined quantity of energy from the first inductive energy transfer element, to the configurable capacitive energy storage element and to one or more capacitive energy storage elements of a plurality of capacitive energy storage elements, each energy storage element of the plurality of energy storage elements being coupled to an associated transducer;

transfer energy from the one or more capacitive energy storage elements and from the configurable capacitive energy storage element to the second inductive energy transfer element; and transfer energy from the second inductive energy transfer element to the power supply.

21. A system for regenerative driving of one or more transducers comprising:

a plurality of transducers;

a configurable capacitive energy storage element;

a first inductive energy transfer element including a first transformer;

a second inductive energy transfer element including a second transformer; and a controller for operating the system through a plurality of driving cycles, the controller configured to, for each of the plurality of driving cycles, enable one or more of the plurality of transducers for driving, resulting in a number of enabled transducers;

configure the configurable capacitive energy storage element based on the number of enabled transducers and a desired overall capacitance;

transfer a predetermined quantity of energy from a power supply to the first inductive energy transfer element including transferring the predetermined quantity of energy from the power supply to a primary winding of the first transformer, distribute the predetermined quantity of energy from the first inductive energy transfer element, to the configurable capacitive energy storage element and to one or more capacitive energy storage elements of a plurality of capacitive energy storage elements, each energy storage element of the plurality of energy storage elements being coupled to an associated transducer, including distributing the predetermined quantity of energy from the primary winding of the first transformer, via a secondary winding of the first transformer, to the configurable capacitive energy storage element and the one or more capacitive energy storage elements, transfer energy from the one or more capacitive energy storage elements and from the configurable capacitive energy storage element to the second inductive energy transfer element including transferring the energy from the one or more capacitive energy storage elements and from the configurable capacitive energy storage element to a primary winding of the second transformer, and transfer energy from the second inductive energy transfer element to the power supply including transferring the energy from the primary winding of the second transformer, via a secondary winding of the second transformer, to the power supply.

22. The system of claim 21 wherein the first transformer and the second transformer are flyback transformers configured to operate in discontinuous conduction mode.

\* \* \* \* \*